Figure 1:
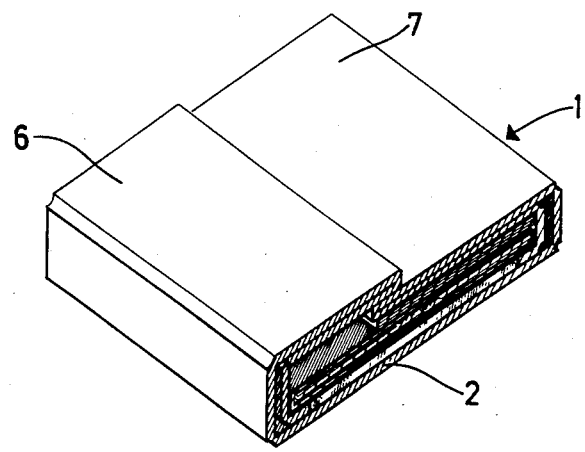

United States Patent [19]

Nielsen

[11] Patent Number: 4,548,487
[45] Date of Patent: Oct. 22, 1985

[54] PROTECTING DEVICE FOR TRANSPARENCIES

[76] Inventor: Bjarne M. Nielsen, Nordre Frihavnsgade 65, st.th., DK-2100 Copenhagen Ø, Denmark

[21] Appl. No.: 495,602

[22] Filed: May 18, 1983

[30] Foreign Application Priority Data

May 21, 1982 [DK] Denmark ................................ 2307/82

[51] Int. Cl.⁴ .............................................. G03B 21/54
[52] U.S. Cl. ............................... 353/120; 353/DIG. 5
[58] Field of Search ....................... 353/120, DIG. 5; 206/455

[56] References Cited

U.S. PATENT DOCUMENTS

| | | | |
|---|---|---|---|
| 3,253,358 | 5/1966 | Wright . | |
| 3,264,767 | 8/1966 | Coffman . | |
| 3,438,703 | 4/1969 | Winnemann | 353/120 |
| 3,524,703 | 8/1970 | Wright | 353/120 X |
| 3,544,211 | 12/1970 | Albee | 353/DIG. 5 X |
| 3,913,740 | 10/1975 | Bisberg | 353/120 X |

FOREIGN PATENT DOCUMENTS 1327826 8/1973 United Kingdom .

OTHER PUBLICATIONS

IBM.—Tech. Bulletin, "Visual Projection System", vol. 9, #12, 5/67.

Primary Examiner—Harry N. Haroian

[57] ABSTRACT

A protecting device (1) for transparencies (8) intended for overhead projection and pivotably mounted about a swivel pin (9) in the protecting device (1) is provided in the form of an unfoldable file. This film comprises a bottom cover (2) shaped as a rectangular frame with a transparent window (5) and comprising side members (6,7) secured thereto situated at opposing rim portions. The swivel pin (9) is mounted in one side of the frame, preferably adjacent one corner of the frame, and in such a manner that it extends substantially perpendicular from said frame. The transparencies (8) are provided with a gripping register (10a, b,c) and are collected in a swivel cover (11) so as to be turned out individually, said swivel cover being pivotably mounted about the swivel pin. As a result, the protecting device can also be used as an easily operatable and detached presentation device which can be moved on the working surface of the overhead projector during the presentation, and whereby the transparencies (8) can be projected in any combination and sequence at the same time as they are always well protected in the device.

13 Claims, 18 Drawing Figures

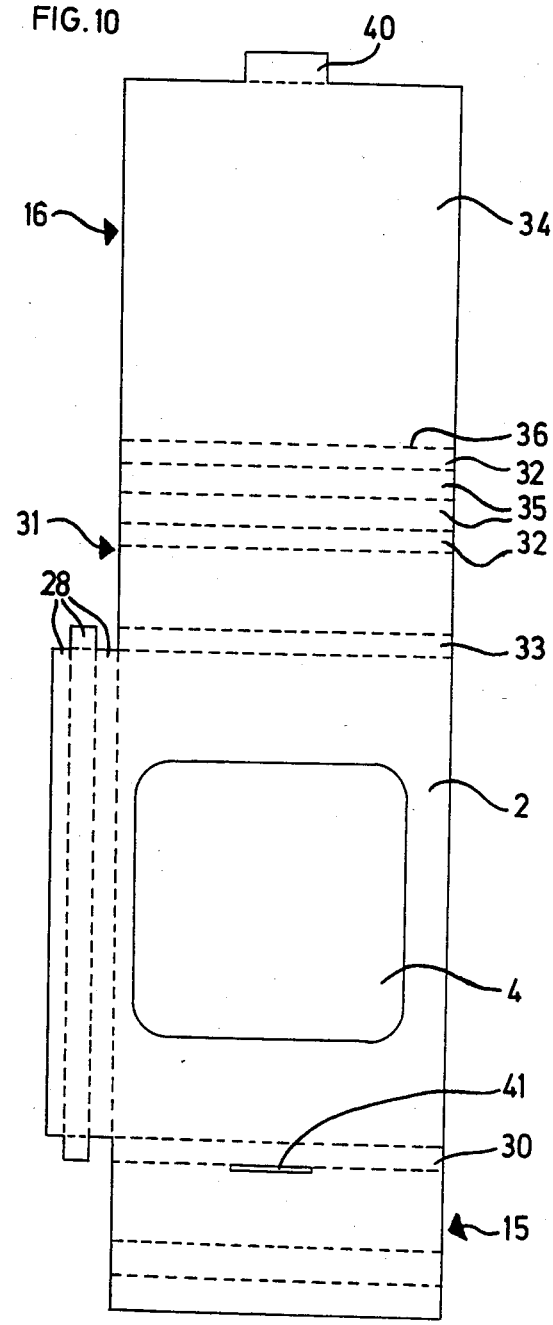

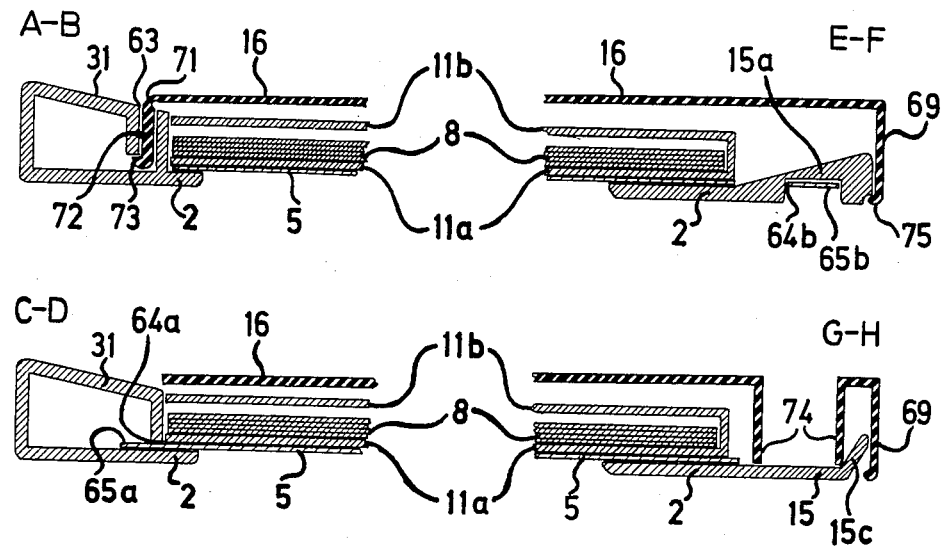
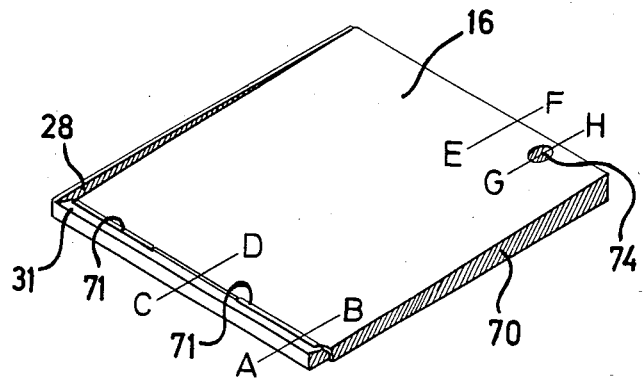
FIG. 11
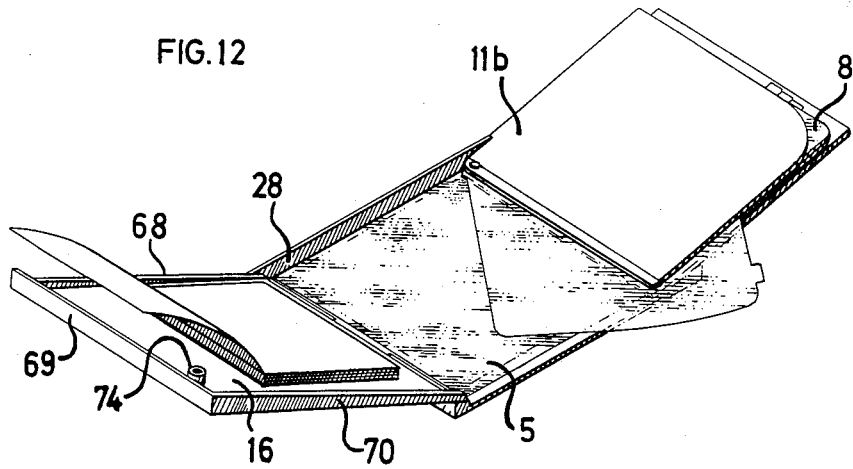
FIG. 12

PROTECTING DEVICE FOR TRANSPARENCIES

The present invention relates to a protecting device for transparencies preferably intended for overhead projectors and pivotably mounted about a swivel pin in the protecting device.

By overhead projection several associated transparencies are usually used for visual communication work. There is often a demand for the possibility of inserting different combinations of these transparencies in the window field of the apparatus so as to produce a composite image. Furthermore there is a demand for the possibility of stepwise building up or breaking down a composite image. Sometimes problems arise in connection with filing and especially during presentation of the transparencies since it can be difficult to keep the slides in order and consequently there is a demand for a system facilitating the handling of the transparencies in an easy manner both during the filing and during the presentation thereof.

A number of various systems for filing and presenting transparencies are known. The most simple systems thereof use loose transparencies filed in separate folders, loose-leaf books or the like covers, from which said transparencies must be removed before the presentation. At the presentation, the transparencies are arranged one by one on the working surface of the overhead projector, optionally in a permanent frame-like structure which must be arranged on the working surface prior to the presentation. The advantages of such a system are that it is very flexible and that associated transparencies can be presented in any possible combination. A suitable frame device renders it possible to obtain a reasonably accurate arrangement of the transparencies during the projection. This system is, however, encumbered with the draw-back that each transparency is not particularly well protected and is easily turned in an incorrect manner. In addition, it is easy to mix up the transparencies during the presentation, and therefore particular auxiliary means are necessary both during the presentation and at the filing thereof as well as a good temporary filing place must be provided adjacent the projector, especially when several sets of loose transparencies are being presented.

Attempts are being made to overcome these drawbacks involved in using loose transparencies by interconnecting said transparencies, e.g. by means of spiral spines in such a manner that the transparencies can be inserted in the image field of the projector by way of turning over said transparencies, whereby a transparency is turned 180° over one of its edges. It is furthermore known to provide spirals and transparencies with a particular unfoldable cover which can be fixed on a frame-like apparatus, said apparatus having to be positioned on the projector prior to the presentation. During the presentation, the transparencies are turned over the spiral spine and inwards across a window in said apparatus, from which they can be turned out again individually or together. The most essential draw-backs arise in connection with the highly limited possibilities of combining the individual transparencies, which implies that the presentation can be rather difficult. In addition the positioning of the transparencies on top of each other is too inaccurate for many purposes owing to the necessary tolerance between the spiral and the transparencies.

U.S. Pat. No. 3,279,109 discloses a protecting device of the above art whereby the transparencies are arranged separately in covers which can be turned inwards and outwards of the protecting device about a swivel pin in said protecting device. This publication also discloses a projecting device for the projection of transparencies on an overhead projector. These devices do not, however, allow presentation of these transparencies while they are still positioned in the protecting device, but require a removal of said transparencies from the covers and from the protecting device and a manual transfer thereof to the projecting device. Subsequently, the transparencies are arranged on a swivel pin and may then be projected by being turned over and away from the image field one by one or in any desired combination and sequence. Beyond the fact that these devices are rather complicated and involve a great risk of mistakes during the movement of the transparencies from one device to another, they provide no protection of the transparencies during the presentation. Furthermore, this device requires a securing of the bottom layer to the working surface of the overhead projector, e.g. by means of magnetic legs, which present particular demands to the bottom layer and to the working surface of the overhead projector concerning shape and materials, and which moreover locks the positioning of the image field during the presentation to some degree.

The object of the present invention is to provide a protecting device of the above type, which simultaneously is capable of serving as an easily operatable presentation device for the transparencies in connection with for instance an overhead projector, whereby the transparencies can be presented in any possible combination and sequence, and which always provides a good protection of the transparencies, and which is furthermore detached and only rests on portions of the working surface of the overhead projector in such a manner that it is easy to move the transparencies on said working surface.

The protecting device according to the invention is characterised in that it is formed as an unfoldable file comprising a bottom cover shaped as a frame and provided with a transparent window as well as side members secured to opposing rim parts of said bottom cover, said side members carrying the transparencies turned out and a counterbalance thereto, respectively, in the unfolded position of the file, and whereby the swivel pin is mounted in the frame at one side thereof, preferably adjacent one corner of the frame, in such a manner that it extends upwards substantially perpendicular to the frame, and that the transparencies are collated in a swivel cover so as to be turned out individually, said swivel cover being pivotably mounted about the swivel pin, and whereby a stopper for the transparencies is present which stops said transparencies during their movement across the transparent window when they have reached the correct presentation position on the transparent window.

As a result it is possible to store a set of associated transparencies as a unit both during the filing and during the presentation thereof, and furthermore the transparencies are well protected against dust, smudging and the like damage. A further advantage of this device is that the presentation can be carried out easily in an arbitrary, desired sequence with a free possibility of combining the transparencies in the set. In addition the presentation can be carried out without a particular, separate frame or other loose auxiliary means, and without necessitating a securing of the file onto the working surface since the unfolded device remains in a position wherein its frame is planarly positioned above the working surface irrespective of the nature and shape of said working surface. At the same time it is easy to displace the device slightly on the working surface during the presentation in such a manner that parts of an image are outside the projecting field. Thus the protecting device combines the advantages of using loose transparencies with the advantages of a permanent binding of said transparencies without involving the drawbacks known in connection with such systems.

According to an embodiment of the device according to the invention, the side members secured to the bottom cover comprise a carrying part for the transparencies with covers, which is secured at one rim portion of the frame and an outer cover secured at the opposing rim portion of the frame, said outer cover covering the frame with transparencies when the file is closed. As a result the side members of the frame can be turned outwards to opposite sides of the frame at the unfolding of the file in such a manner that the carrying part to one side forms a carrying base for the swivel cover with transparencies turned outwards from the projecting field, while the cover turned outwards at the opposite side of the frame can serve as a counterbalance transferring an oppositely directed moment to the frame relative to the moment transferred to the frame by the swivel cover with transparencies turned outwards. Furthermore, this swivel cover may form a holder and a base for a booklet, a description of the figures, pens and the like supporting material to be used during the presentation. In addition the cover protects both the swivel cover with the transparencies as well as the carrying part and the booklet etc. when the file is folded.

According to an embodiment of the device according to the invention the bottom cover and the side members are punched out in one piece from a sheet material of moderately bendable and extremely ductile plastics, and the carrying part and/or the opposing cover are shaped by bending portions of the plate material along bending lines and by securing said portions bent inwards to the bottom cover in such a manner that hollow spaces are formed between the layers of the carrying part and/or between the layers of the cover. This embodiment allows a rational and inexpensive manufacture of the protecting device having a very low weight, whereby the hollow spaces permit a resilient support of the transparencies turned outwards and of the booklets etc. on the carrying part and the cover, respectively.

It is according to the invention preferred that the inner layer of the carrying part and/or the cover is shorter than their outer layers, and that additional parallel bending lines are provided in both layers, whereby the unfolded side members extend obliquely upwards from the bottom cover and it is easy to fold the carrying part over the swivel cover with transparencies turned inwards and to fold the cover over the carrying part.

According to an embodiment of the device according to the invention the bottom cover and the side members are punched out in one piece with bending lines of a rather rigid sheet material, and the carrying part may be folded and secured to the bottom cover in such a manner that a wedge is formed, the spigot end of which faces the transparent window, and the inclined surface of which forms a permanent bottom layer for a border of the swivel cover turned outwards, and whereby the blunt end of the wedge simultaneously forms a spine closing the side in question of the folded file, and where an inner part of the cover is preferably folded and secured to the bottom cover in such a manner that it forms a box-shaped superstructure on the bottom cover next to the transparent window, said superstructure being of a trapezoidal profile, the substantially vertical side of which nearest to the transparent window is shorter than the opposing substantially vertical side farthest from the transparent window while the outermost part of the cover is connected to the innermost part of said cover at the inner and upper rim of the superstructure in such a manner that this part can turn about said rim, whereby when turned inwards said part covers the transparencies in the swivel cover, the bottom cover, and the carrying part, and whereby when turned outwards said part extends obliquely upwards and outwards and is supported by the superstructure. As a result, the cover and the swivel cover can be turned outwards to opposite sides of the frame, where they are supported by solid structures in planes inclining towards the frame. Furthermore, the torques of the parts projecting beyond the bottom cover counterbalance each other. Such a device can be manufactured in a simple and inexpensive manner, e.g. of fiberboard in a conventional board processing machine.

The cover may advantageously comprise a closing flap at its free end, said flap being adapted to be mounted and secured at the opposite side of the frame or in the carrying part in the folded position of the file.

According to a preferred embodiment of the invention, the side members are cast integral with the bottom cover of a rigid plastic material, while the outer cover is cast of a plastic material of great ductility and by means of a hinge connected to the side member opposite the carrying part of the swivel cover and the transparencies turned outwards, said outer cover furthermore being shaped as a cover with side rims, which when the file is closed enclose the bottom side of the bottom cover and the carrying part. In this manner an embodiment of the device is obtained which possesses a high resistance to impact and a high wear-resistance and which simultaneously closes tightly on all sides so that the transparency contained therein is protected against damages, dust and moisture to a maximum.

The carrying part comprises advantageously one or more wedge-shaped brackets, the spigot end of which faces the transparent window and the blunt end of which is secured to a rim extending substantially vertically from the bottom cover. In this manner the consumption of materials for the carrying part is minimized at the same time as the parts of the swivel cover mounted on the brackets can be turned in an easy manner upwards so as to rest on the upright rim when the swivel cover is turned away from the frame.

The cover is hinged to the side member which advantageously is formed as a trapezoidal box perforated at the rim of the surface inclining towards the frame and positioned adjacent the transparent window, and the outer cover may comprise a locking means with barbs secured to its hinge, said locking means being pressed fixedly into the side member at the perforations thereof.

The outer cover is advantageously provided with a small bead at the outermost portions of the side rims thereof, which at closing of the file surround the bottom cover and the carrying part. When the device is closed, the bead grips about notches corresponding thereto along the bottom sides of the bottom cover and the carrying part. Furthermore the cover may be provided with a pipe abutting the bottom cover in a substantially vertical direction when the file is closed, and on parts opposing the pipe the carrying part may comprise grooves. In this manner the outer cover is locked about the subject matter of the file when said file is closed, but it may be easily disengaged by gripping by the thumb of the right hand in the tube and by the remaining fingers in the grooves so as to be turned outwards.

The transparent window is advantageously made of a transparent film of plastics provided with flaps with barbs inserted in suitable slots in the side members, said film being correctly positioned between the bottom cover and the swivel cover by means of apertures punched out which fit over low projections opposite the corners of the transparent opening and along a low groove in the frame. In this manner the transparent window is easily replaceable in case of smudging or damage, the flaps being released from the slots by a hard pull so that the old film can be removed and another film inserted.

According to a preferred embodiment of the protecting device, the swivel pin is mounted at a corner of the frame in the side thereof where the carrying part is positioned, and the transparencies and the swivel cover are interconnected by means of a hollow rivet through swivel holes. The hollow rivet may be pressed down on the swivel pin or it may be provided with an internal thread corresponding to an external thread on the swivel pin in such a manner that the rivet can be screwed off and on the pin. As a result, the swivel cover and the transparencies are easily turned between the position above the frame in the projecting field and a position outside said projecting field, as well as the swivel cover with the transparencies is secured by the swivel pin so as to be easily replaceable by pulling or screwing off the hollow rivet. The connection between the swivel cover and the transparencies is advantageously ensured by means of a corbel or a disc on the free end of the rivet, or the hollow rivet may be pressed or screwed downwards into a second hollow rivet, whereby a bushing with corbels is formed on both sides of the swivel cover. As a result, the removed swivel cover with transparencies can be opened and closed so as to permit replacement of the transparencies.

According to a preferred embodiment of the device according to the invention, a rectangular top cover is secured to the bottom cover and the side members, said top cover extending vertically upwards from said bottom cover. This rectangular top cover extends between the side members along the rim of the bottom cover which is positioned adjacent the swivel pin and further to such a height relative to the bottom cover that it corresponds to the thickness of the closed device. In this manner the subject matter of the file is protected against dust from the top when it is vertically filed with said top cover turning upwards, and the inner side of the top cover serves as a permanent, common stopper for the transparencies when said transparencies are turned over the transparent window.

According to a preferred embodiment of the device, bending lines are provided in the top and bottom part of the swivel cover parallel to the rims situated adjacent the projecting field upon the turning outwards. These bending lines extend at such a distance from the rims that the uppermost bending line is vertically positioned relative to the lowermost bending line, and that borders of the swivel cover situated above the bottom cover are pressed downwards by the swivel pin into planes substantially parallel to the plane of the transparent window, while the remaining, outermost portions of the swivel cover of the carrying part are pressed upwards into an obtuse angle along the bending lines. When being turned inwards the transparencies are pressed downwards into a horizontal position above the transparent window at the border positioned between the horizontal borders of the cover, and the hollow appearance of the transparencies does not automatically cause a partial sliding of said transparencies over the transparent field.

A stop bar is advantageously situated on the bottom side of the swivel cover, and this stop bar falls over the upright rim of the carrying part so as to rest against said rim when the swivel cover is completely turned outwards. In this manner it is possible to prevent an undesired turning back of the swivel cover turned outwards, while said stop can be easily released by lifting the projecting portions of the swivel cover, whereafter said portions can be turned downwards over the transparent window.

A transparency according to the invention may be shaped as a transparent folder, whereby the user may place his own transparencies in the device by inserting them into such folders without separating the device.

According to an embodiment of the device according to the invention the carrying part is a horizontal extension of the bottom cover and the swivel cover is made of a rigid plastic material with a bending in an obtuse angle so that the rim portions of the swivel cover facing the transparent window are positioned in planes, when said swivel cover is turned outwards. The planes are substantially parallel to the transparent window, while the portions of the swivel cover projecting beyond the carrying part incline upwards and outwards. The relation of the thickness of the material to the flexibility may be chosen in such a manner that the bending is straightened completely or partially at pressure from the cover when the file is folded over the turned in swivel cover.

The device according to the invention may advantageously be made integrally of lightweight materials such as fibreboard or plastics such as polypropylene, or the bottom cover, the side member, the top cover, and the swivel pin may be cast in one piece of a rigid material such as polyethylene or milled in one piece of aluminum, while the outer cover may be cast of a ductile material such as polypropylene, and the transparent window may advantageously be punched out of scratch-resistant, high-transparent plastics such as polycarbonate, and the swivel cover may be cast or bent out of a slightly flexible plastics such as nylon or polybutene, or it may be punched out and bent out of thick board or fibreboard. These materials allow achievement of a construction having favourable strength capacities and low weight as well as a suitable flexiblity in the portions where it is necessary.

Figure 2:
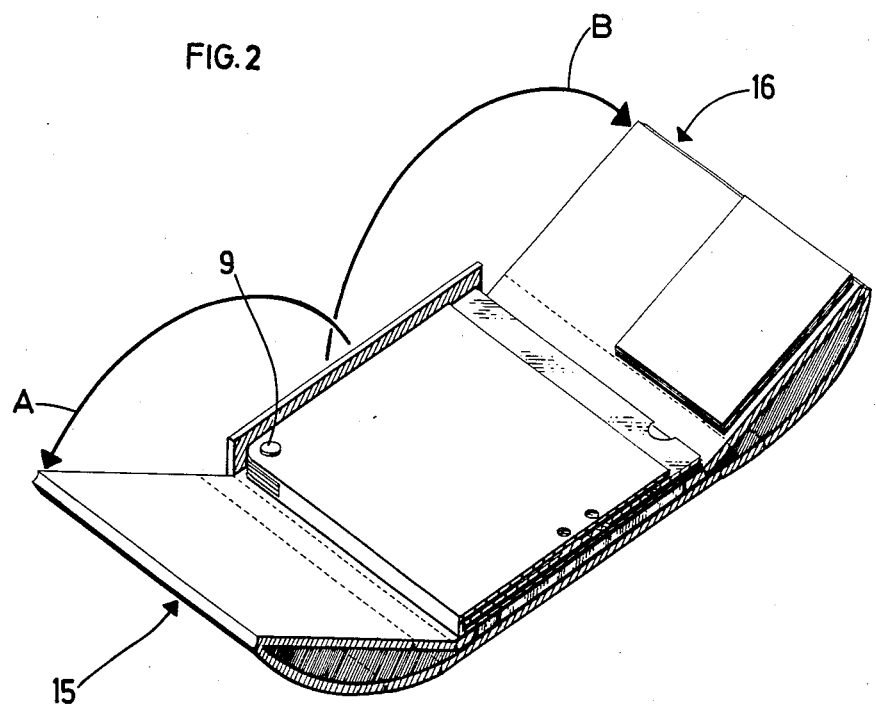
Figure 3:
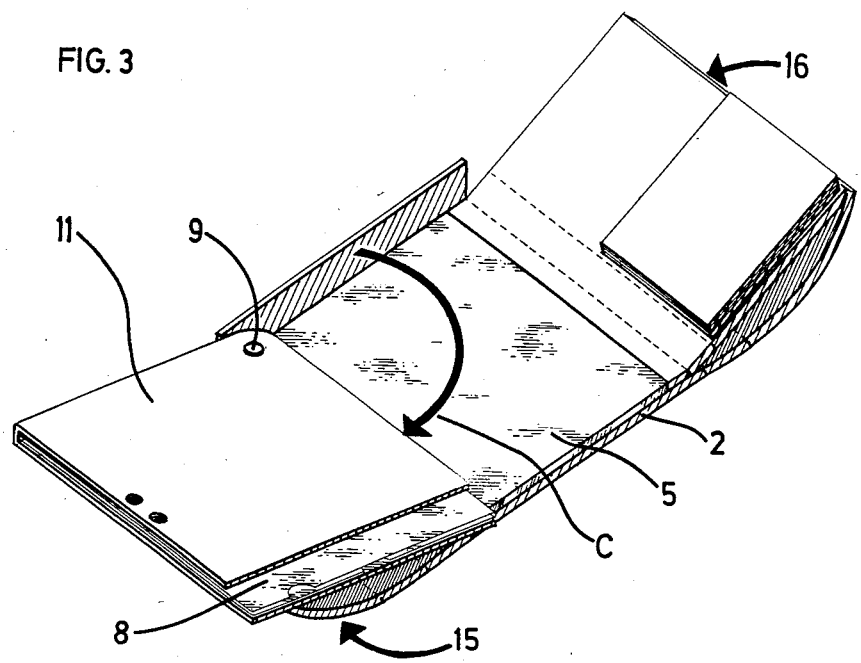
Figure 4:
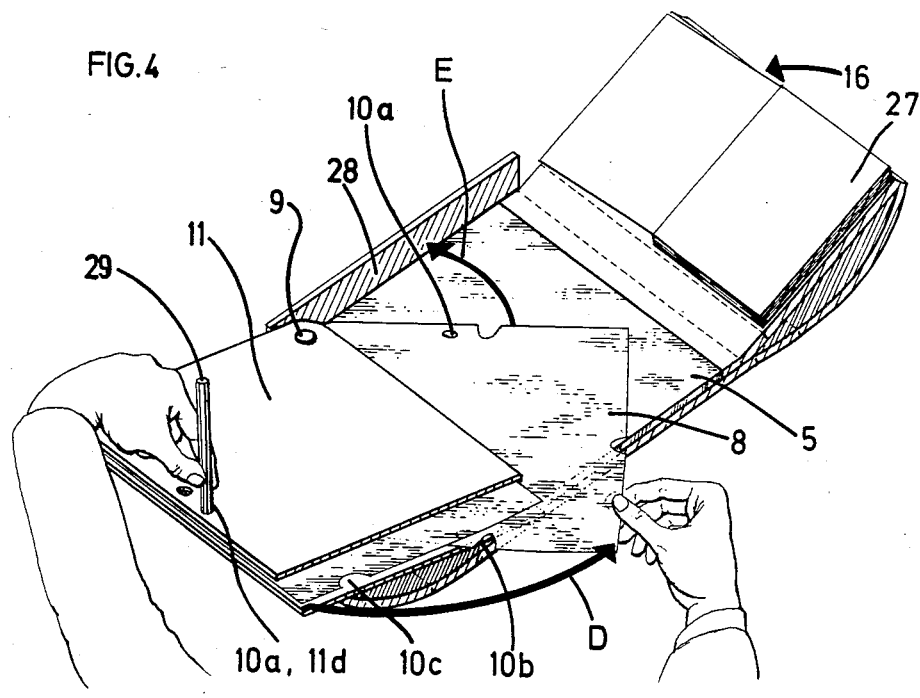
Figure 5:
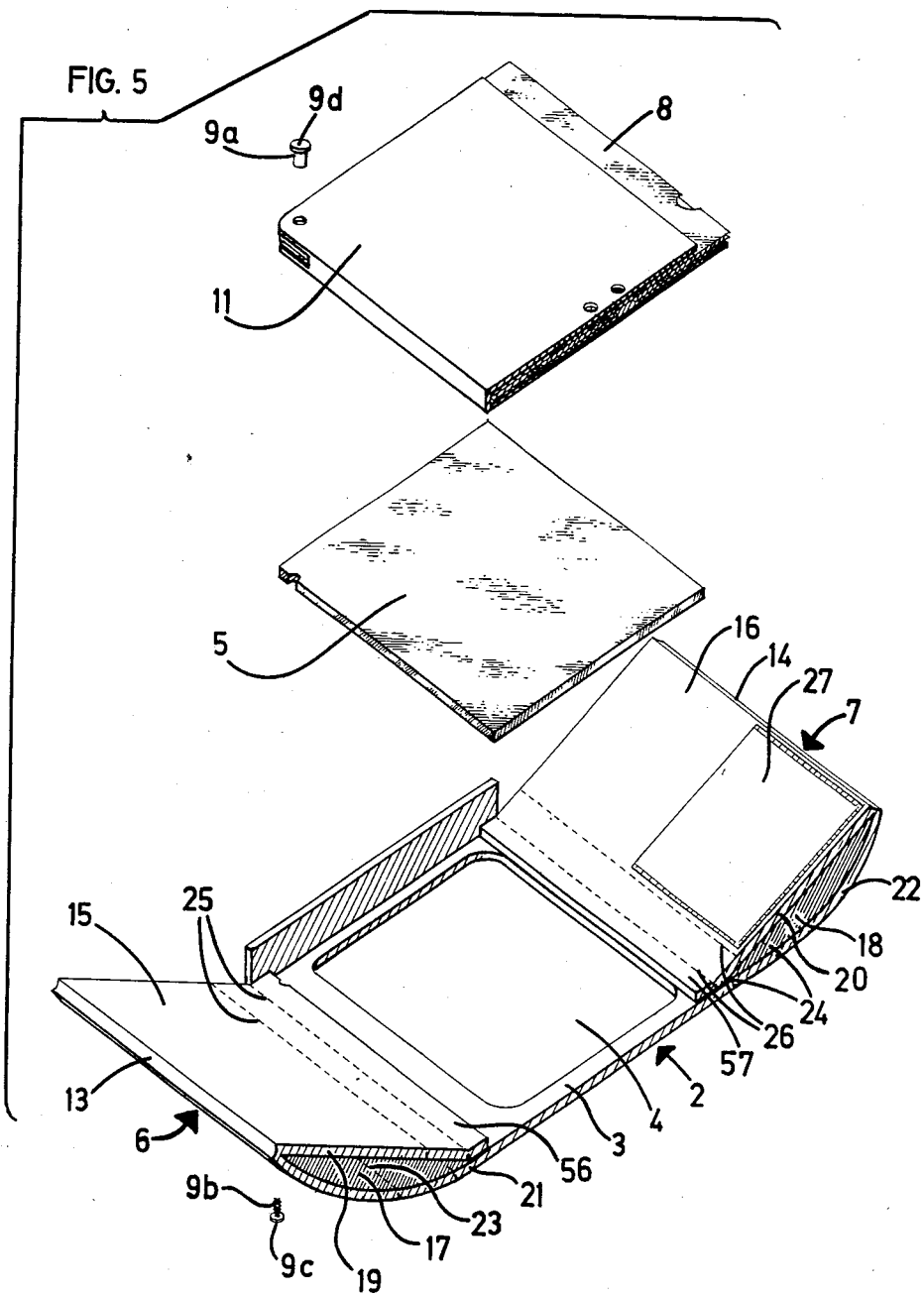
Figure 6:
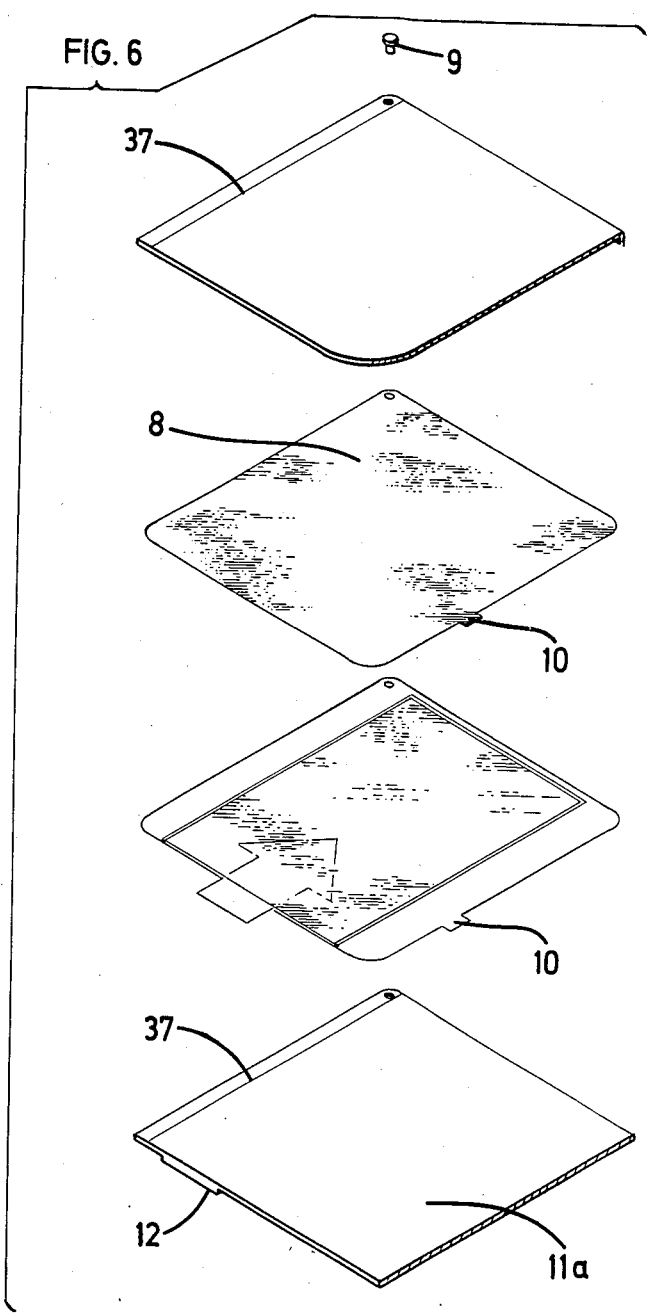
Figure 7:
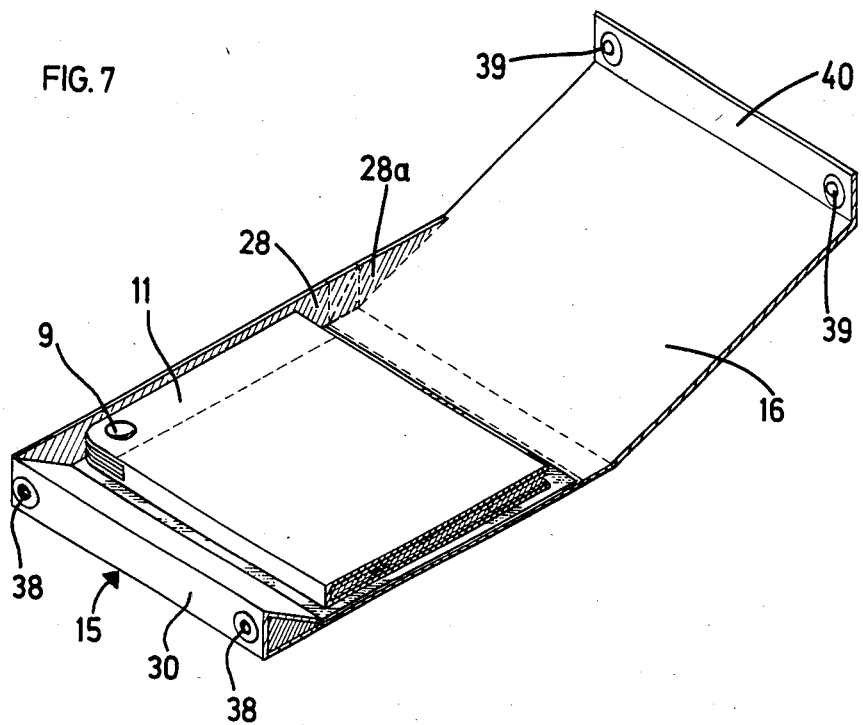
Figure 8:
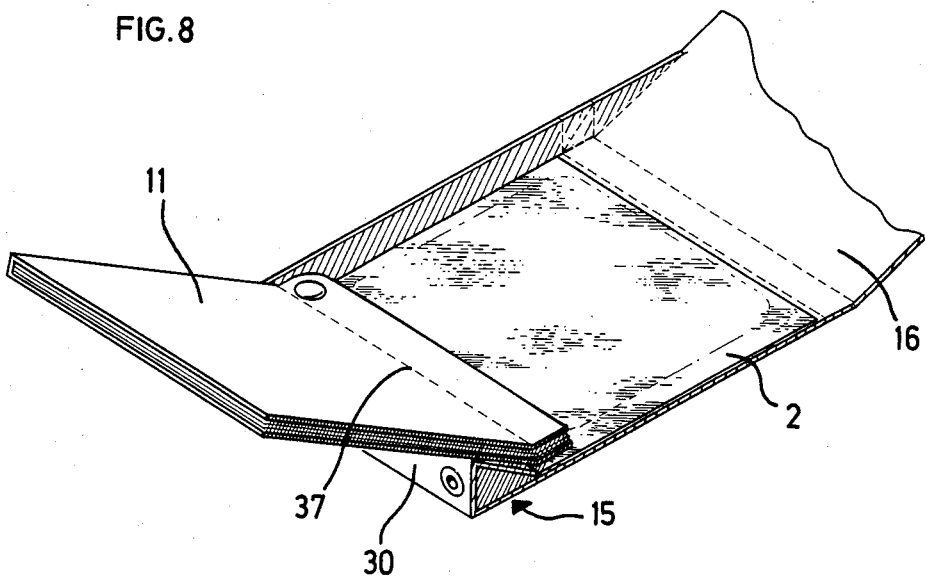
Figure 9:
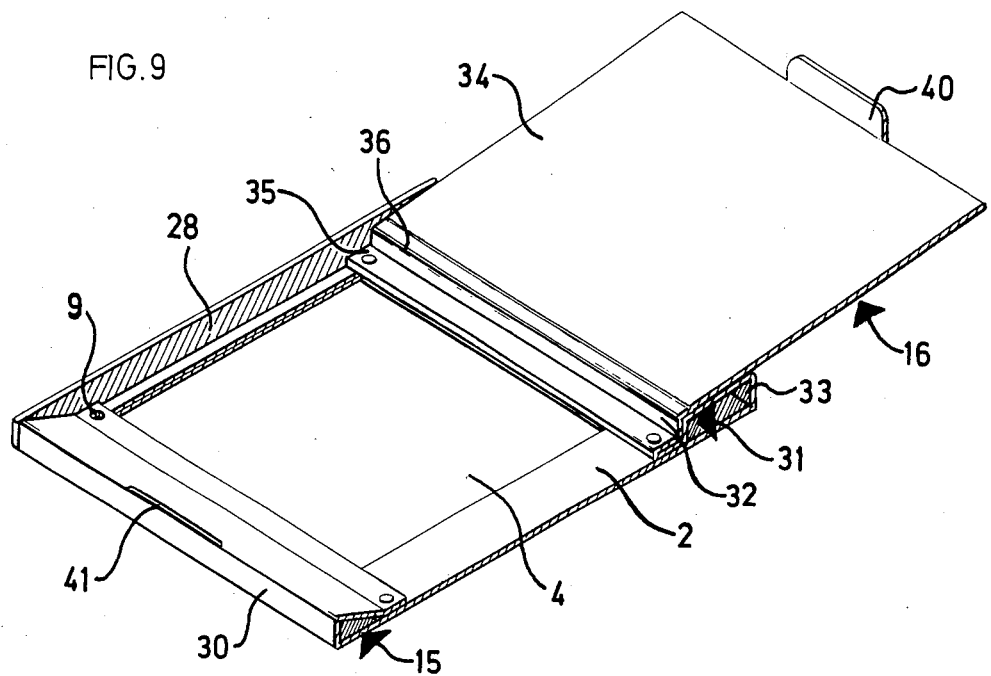

The invention will be described below with reference to the accompanying drawing, in which FIG. 1 illustrates a folded protecting device according to the invention with swivel cover and transparencies, whereby the transparencies are turned outwards clockwise, FIG. 2 illustrates an unfolded protecting device with a booklet, FIG. 3 illustrates the protecting device of FIG. 2 with a turned out swivel cover with transparencies ready for projection, FIG. 4 illustrates the protecting device of FIG. 3 with a transparency being turned inwards for projection and with an open booklet, FIG. 5 is an exploded view of the protecting device of FIG. 2 with a transparent window, a swivel cover with transparencies, and a swivel pin, FIG. 6 is an exploded view of a swivel cover with a swivel rivet, a usual transparency, and a transparency shaped as a folder, whereby the transparency is to be turned outwards clockwise, FIG. 7 illustrates a second embodiment of a protecting device according to the invention, whereby the transparencies are to be turned outwards clockwise, FIG. 8 illustrates the protecting device of FIG. 7 with a turned out swivel cover with transparencies, FIG. 9 illustrates a third embodiment of a protecting device according to the invention whereby the transparencies are to be turned outwards clockwise, FIG. 10 illustrates a sheet-shaped blank punched out for the manufacture of the protecting device of FIG. 9, FIG. 11 illustrates a fourth embodiment of a closed protecting device according to the invention with inserted cuts, whereby the transparencies are to be turned outwards counter-clockwise, FIGS. 11 A-B, 11 C-D, 11 E-F and 11 G-H are cross sectional views along lines A-B, C-D, E-F and F-H of FIG. 11.

Figure 14:
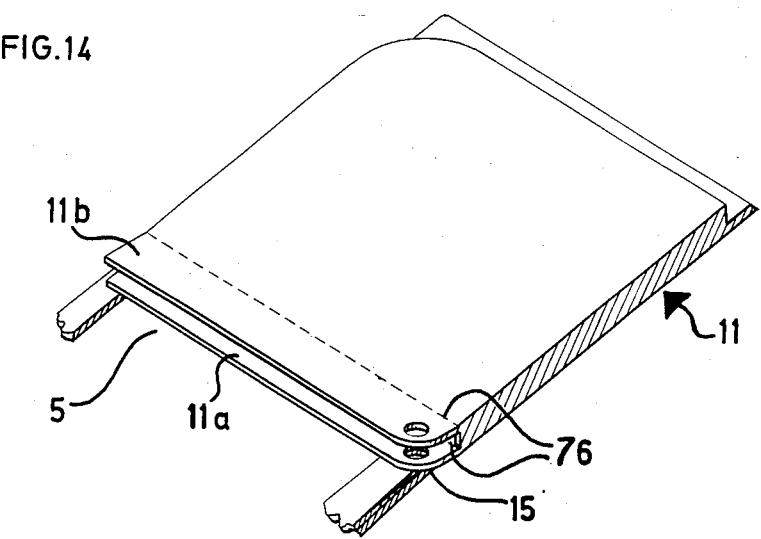
Figure 13:
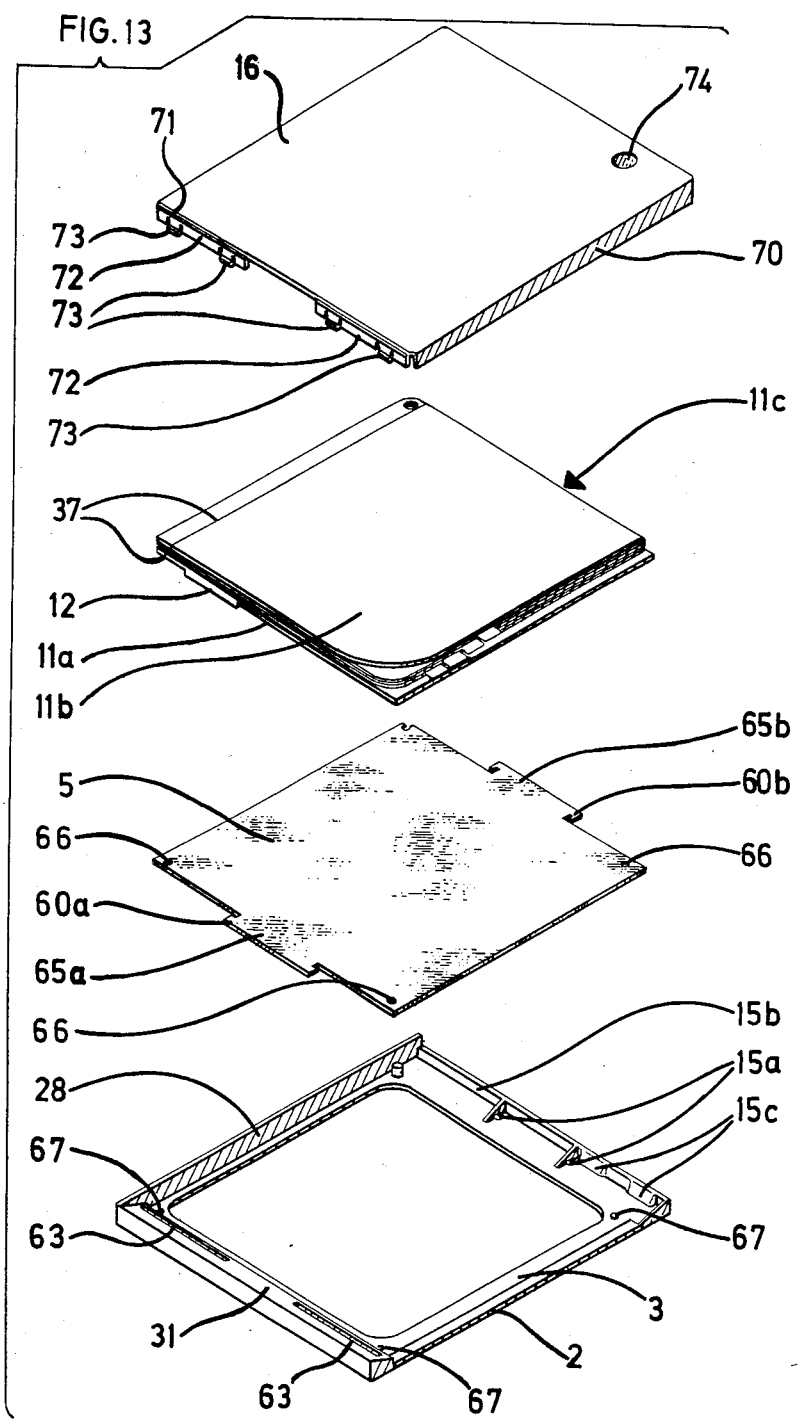

FIG. 12 is a top, perspective view of an unfolded protecting device with a turned out swivel cover, whereby a transparency is partially turned inwards and with an open booklet, FIG. 13 is an exploded view of the protecting device of FIG. 11, and FIG. 14 illustrates another embodiment of a swivel cover according to the invention without transparencies and swivel rivets, whereby the transparencies are turned outwards clockwise relative to a portion of the bottom cover and the carrying part.

The protecting device illustrated in FIGS. 1-6 comprises a foldable file 1, the bottom cover 2 and side members 6 and 7 of which are punched out in one piece from a sheet material of plastics. The bottom cover 2 is shaped as a rectangular frame 3 with a presentation opening 4. A transparent window 5 secured to the bottom cover 2 is situated above the presentation opening 4. The side members 6 and 7 are bent inwards along bending lines 13 and 14 and at their outermost ends 56, 57 they are secured to the bottom cover 2. The side members including two layers and being bent inwards form a carrying part 15 for the transparencies 8 with swivel cover 11 and a cover 16, respectively. When the file is folded the cover 16 protects the transparencies, and when the file is unfolded said cover forms a base for a booklet 27. The inner layer 19, 20 of the carrying part and the cover is shorter than the outer layer 21, 22 of said carrying part and cover in such a manner that open hollow spaces 17, 18 are formed between said layers when the file 1 is unfolded, cf. FIGS. 2-5. When unfolded the carrying part 15 and the cover 16 are thus self-supporting and more or less resiliently flexible depending on the material used. Bending lines in the outer layers 23, 24 and in the inner layers 25, 26, respectively, imply that the carrying part and the cover are easily foldable to form a protecting file about the transparencies, cf. FIG. 1. The transparencies 8 with swivel cover 11 are pivotably mounted about a swivel pin 9 which is secured in a corner of the bottom cover 2 adjacent the carrying part 15. The swivel pin comprises a stud 9b provided with a head 9c. This stud is screwed into a hollow rivet 9a with an internal thread and with a corbel 9d capable of locking the transparencies with the swivel cover. FIG. 6 illustrates the building up of the swivel cover 11 with transparencies 8. The swivel cover comprises a bottom part 11a and a top part 11b with a spine 11c. A stop bar 12 is secured to the bottom side of the bottom part 11a. The transparencies 8 are provided with a gripping register with holes 10a and notches 10b in opposing side rims of the transparencies whereby the number of holes corresponds to the number of remaining transparencies in the swivel cover, and whereby the holes are situated opposite the notches of the remaining transparencies as well as in a third side rim of the transparencies opposite the swivel pin. Thus a number of notches 10c punched out in each transparency corresponds to the number of remaining transparencies in the swivel cover in such a manner that each transparency comprises a field not punched out where the remaining transparencies are punched out. Corresponding holes 11d and grooves are provided in the top part 11b opposite the holes 10a and the notches 10b in the side rim farthest from the swivel pin.

These holes 11d and grooves oppose the notches 10c in the third side rim of the transparencies, whereby these notches are detached. The file is furthermore provided with a top part 28 secured to the bottom cover 2 and extending between the carrying part 15 and the cover 16 along the rim of the bottom cover nearest the swivel pin 9 and at a height from the bottom cover corresponding to the thickness of the folded file. This top part 28 protects the transparencies against penetration of dust when the folded file is vertically filed on a shelf with this rim turning upwards.

FIGS. 2-4 illustrate how the protecting device may be used as a projecting device, e.g. on an overhead projector. The folded protecting device 1 is situated with the bottom cover turning downwards on the working surface and is opened by unfolding the carrying part 15 and the cover 16, cf. the arrows A and B in FIG. 2. Subsequently, the swivel cover 11 with the transparencies 8 is turned outwards over the carrying part 15, cf. the arrow C in FIG. 3. Now the transparencies 8 may be turned inwards into the image field about the swivel pin 9, cf. the arrows D and E in FIG. 4, by means of the gripping register with the notches 10b and 10c and a stick 29 through the holes 10a, 11d. During this movement, the top part 28 may simultaneously serve as stopper for the transparencies 8 turned inwards and thereby ensure that the transparencies turned inwards are accurately positioned on top of each other. When turning each transparency 8 back from a set of transparencies to the swivel cover 11, the stick 29 can be moved to the hole 10a at the top part 28, whereby the transparencies not to be turned back are retained by means of the stick 29. During the entire presentation, the booklet 27 is situated freely on the inside of the cover 16 in such a manner that the text can be followed without difficulties during the presentation. When the swivel cover is turned outwards over the carrying part 15, said cover serves as a stop against the stop bar 12 in such a manner that the swivel cover does not turn back over the transparent window 5 in the image field if not desired.

FIG. 6 illustrates the embodiment of a swivel cover 11 for a single transparency. This swivel cover is provided with a transparent folder in which the transparency may be inserted as indicated at the arrow. The swivel cover is furthermore provided with a gripping register with tabs 10.

FIGS. 7 and 8 illustrate a second embodiment of the protecting device, whereby the carrying part 15 is shaped as a wedge with the spigot end facing the transparent window and with a substantially vertical spine 30 being slightly resilient. The cover 16 includes one layer and is provided with a closing flap 40 with snap fasteners 39 which at the closing of the file may be pressed into snap fasteners 38 in the spine 30 of the wedge. The top part 28 has been extended by a foldable connection 28a secured to the cover and which when the file is open serves as a tie keeping the cover 16 raised above the bottom cover. As indicated in FIG. 8, the swivel cover is provided with a hinge fold 37 ensuring a correct positioning of the turned out swivel cover and that the transparencies extend completely planarly across the window when being turned inwards over said window.

FIG. 9 illustrates a third embodiment of the protecting device according to the invention, said embodiment being manufactured by folding board. FIG. 10 illustrates a blank punched out for the manufacture of the embodiment of FIG. 9. This embodiment is provided with a wedge-shaped carrying part 15 with a substantially vertical spine 30 and with a cover 16 and a top part 28 extending therebetween and being secured to one side rim of the bottom cover 2. The cover 16 comprises a flap 40 insertable in a slot 41 in the carrying part 15 when the file is being closed, said flap thereby retaining the cover 16. A top part 28 extends between the carrying part 15 and the cover 16 secured to said carrying part and said cover as well as to the side rim of the bottom cover 2 nearest the swivel pin 9. The portion of the cover 16 nearest the bottom cover 2 is folded into a box-shaped superstructure 31 of a trapezoidal profile and secured to the bottom cover 2 by means of a bent securing part 35, whereby the outermost portion 34 of the cover may turn about the inner and upper rim 36 of said box-shaped superstructure. The inner, substantially vertical side portion 32 of the box-shaped superstructure 31 is slightly shorter than the outer, substantially vertical side portion 33 of said superstructure, whereby the outermost portion 34 of the open cover inclines slightly upwards away from the presentation opening 4. This opening is coated with a transparent window situated above the bottom cover 2 and the securing part 35 and the innermost portion of the carrying part 15. As illustrated in FIG. 10, this embodiment may be punched out in a continuous piece of board foldable along the indicated folding lines and be maintained in the desired shape, e.g. by means of rivets as indicated in FIG. 9.

The protecting device illustrated in FIGS. 11-13 comprises a bottom cover 2 cast integral with a box-shaped superstructure 31 and a carrying part 15. The box-shaped superstructure 31 is at its inner, upper rim perforated by holes 53 for the securing of the cover 16. The carrying part 15 is shaped as two wedge-shaped brackets 15a and a rim portion 15b extending upwards from the bottom and comprising grooves 15c allowing an opening of the file. A top part 28 is also cast integral with the bottom cover 2 and serves as a stopper when turning the transparencies 8 inwards. Slots 64a, 64b are provided in the box-shaped superstructure 31 and in the brackets 15a, said slots allowing a securing of the replacement transparent window 5. This window is provided with suitable flaps 65a, 65b with barbs and furthermore with holes 66 punched out and fitting over low projections 67 on the frame 3 opposite the corners thereof. The swivel cover 11 comprises a bottom part 11a, a top part 11b, and a spine 11c, the two first-mentioned being provided with bending lines 37. These bending lines define borders from the remaining parts of the swivel cover 11, said borders being horizontally situated above the transparent window 5. In this position the swivel cover 11 inclines upwards from these borders. In this manner the swivel rivet 9 may press the transparencies 8 downwards into such a turned out position with a bending or hollow appearance downwards that an undesired turning backwards of the transparencies 8 over the transparent window 5 is avoided. The cover 16 is cast in the form of a cover with a top rim portion 68, a side rim portion 69, and a bottom rim portion 70, a hinge portion 71, flaps 72 with locking pins 73 being secured to said bottom rim portion. When assembling the device, these flaps grip downwards about the holes 63 in the box-shaped superstructure 31. The cover furthermore comprises a tube 74 which when closing the file abuts the carrying part 15 and serves as a grip for the right thumb at the opening of the cover. The side rim portion 69 of the cover 16 and the portion of the bottom rim portion 70 nearest the side rim portion 69 are provided with a small bead 75 which at closing of the file engages a notch in the bottom cover 2 and the carrying part 15.

FIG. 14 illustrates a swivel cover 11 without transparencies. This cover is turned outwards over a horizontal carrying part 15 and bent into an obtuse angle along lines 76 parallel to the rim nearest the transparent window 5, whereby borders of the top part 11b and bottom part 11a of the swivel cover 11 are horizontally positioned above the carrying part 15 while the remaining parts of the swivel cover 11 incline upwards and outwards from these borders.

I claim:

1. A protecting device for transparencies comprising: an unfoldable file having a bottom cover which forms a frame having a transparent window therein, said file having a pair of side members hinged to opposed edges of said bottom cover; a swivel pin mounted on said frame and extending perpendicularly to said frame; a swivel cover mounted on said pin for pivotal movement in a plane parallel to said bottom cover between a position overlying said window when said file is folded and a position offset from said window and overlying one of said side members when said file is in unfolded condition, said swivel cover being adapted to receive within it a plurality of transparencies to be pivotably mounted on said pin for independent pivotal movement about said pin into and out of said swivel cover so that when said swivel cover overlies said one side member in a file-unfolded condition, each transparency can be selectively pivoted between a position overlying said window and a position within said swivel cover; and a stop member attached to said bottom cover for stopping pivotal movement of each transparency when such transparency overlies said window.

2. A protecting device as in claim 1 wherein the other of said side members, in the folded condition of the file, overlies said swivel cover.

3. A protecting device as in claim 2 wherein at least one of said side members is formed of inner and outer layers which in the unfolded condition of the file form spaces therebetween.

4. A protecting device as in claim 3 wherein the inner layer of said other side member is shorter than said outer layers, and wherein additional parallel bending lines are provided in both layers.

5. A protecting device as in claim 2 wherein said one side member is permanently connected with said bottom cover and forms a surface inclining upwards and outwards from said transparent window.

6. A protecting device as in claim 5 wherein said transparent window is a thick, transparent film with flaps projecting from two opposing edges thereof and comprising barbs adapted to be locked in slots in a superstructure and in two brackets forming part of said one side member.

7. A protecting device as in claim 2 wherein said superstructure is box-shaped and of a trapezoidal profile and is secured to said bottom cover next to said transparent window opposite said one side member, the substantially vertical side of said superstructure adjacent the transparent window being shorter than the opposing substantially vertical side farthest from the transparent window, said other side member at its inner part being hinged to the inner, upper rim of the superstructure in such a manner that said other side member can turn about said rim so as to cover the transparencies and the bottom cover when turned in and in the turned out position extends obliquely outwards and upwards while being supported by the superstructure.

8. A protecting device as in claim 2 wherein said swivel pin is mounted at a corner of said frame at the side to which said one side member is secured, and is shaped as a stud provided with a head and screwed into a hollow rivet comprising an internal thread and a corbel.

9. A protecting device as in claim 2 wherein said stop member is formed by a top member extending upwards from said bottom cover and secured to said bottom cover and extending between said opposing side members along the edge of said bottom cover adjacent said swivel pin and to a height above said bottom cover corresponding to the thickness of the folded file.

10. A protecting device as in claim 16 wherein a bending line is shaped in each top and bottom part of said swivel cover and extends along the sides of said swivel cover facing the transparent window when the swivel cover overlies said one side member.

11. A protecting device as in claim 2 wherein a stop bar is secured on the bottom side of said swivel cover, said bar falling over the rim of said one side member so as to rest against this rim when said swivel cover overlies said one side member.

12. A protecting device as in claim 2 wherein said one side member forms a substantially horizontal extension of said bottom cover while the swivel cover is bent in an obtuse angle along bending lines which define borders of a top part of said swivel cover and a bottom part of said swivel cover horizontally positioned above said one side member from the remaining parts of the top part and the bottom part, which incline upwards from the horizontal borders when the swivel cover overlies said one side member.

13. A protecting device as in claim 12 wherein the obtuse angle in said swivel cover is straightened completely or partially when said swivel cover turned in is pressed downwards by said other side member.

* * * * *